(12) United States Patent
Zuidema et al.

(10) Patent No.: US 7,924,351 B2
(45) Date of Patent: Apr. 12, 2011

(54) AUTOSTEREOSCOPIC DISPLAY

(75) Inventors: Hans Zuidema, Eindhoven (NL);
Cornelis Franciscus Josephus Geerts, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 200 days.

(21) Appl. No.: 12/279,905

(22) PCT Filed: Feb. 20, 2007

(86) PCT No.: PCT/IB2007/050539
§ 371 (c)(1),
(2), (4) Date: Aug. 19, 2008

(87) PCT Pub. No.: WO2007/096818
PCT Pub. Date: Aug. 30, 2007

(65) Prior Publication Data
US 2009/0009669 A1    Jan. 8, 2009

(30) Foreign Application Priority Data
Feb. 24, 2006 (EP) ................................. 06110424

(51) Int. Cl.
*G02F 1/1335* (2006.01)
(52) U.S. Cl. ................. 349/15; 349/57; 349/58
(58) Field of Classification Search ............ 349/15, 349/57, 58
See application file for complete search history.

(56) References Cited

U.S. PATENT DOCUMENTS

| | | | |
|---|---|---|---|
| 5,146,703 | A | 9/1992 | Boden |
| 6,115,101 | A | 9/2000 | Kainen |
| 6,865,033 | B2 | 3/2005 | Laverty |
| 2003/0076603 | A1 | 4/2003 | Tung et al. |
| 2003/0161040 | A1* | 8/2003 | Ishii et al. ............ 359/463 |
| 2003/0174260 | A1 | 9/2003 | Labrousse et al. |
| 2004/0165118 | A1 | 8/2004 | Huber |
| 2004/0201887 | A1 | 10/2004 | Takano |
| 2006/0050382 | A1 | 3/2006 | Jahrmarkt et al. |

FOREIGN PATENT DOCUMENTS

| | | |
|---|---|---|
| DE | 20106691 U1 | 7/2001 |
| GB | 2196166 A | 4/1988 |
| JP | 08254755 A | 10/1996 |
| JP | 09258177 A | 10/1997 |
| JP | 11072851 A | 3/1999 |
| JP | 2000029399 A | 1/2000 |
| JP | 2003344807 A | 12/2003 |
| WO | 1997048003 A1 | 12/1997 |
| WO | 02086589 A2 | 10/2002 |
| WO | 2004023823 A1 | 3/2004 |
| WO | 2004111703 A1 | 12/2004 |

* cited by examiner

*Primary Examiner* — Sarah Hahm
(74) *Attorney, Agent, or Firm* — Larry Liberchuk

(57) ABSTRACT

An autostereoscopic display apparatus comprises a lenticular array (20) mounted to a display panel (10) which is mounted to a backlight unit (12). A lateral securing member is (30) disposed directly between the backlight unit (12) and the edge of the lenticular array (20) to prevent relative movement in a direction parallel to the plane of the panel (10). The stack comprising the panel (10) and lenticular plate (20) is prevented from sliding during regular use and from vibration during transportation.

10 Claims, 2 Drawing Sheets

SECTION A - A

AUTOSTEREOSCOPIC DISPLAY

FIELD OF THE INVENTION

The invention relates to an autostereoscopic display comprising a lenticular array mounted on a display panel.

BACKGROUND OF THE INVENTION

A known autostereoscopic display is described in GB 2196166 A. This known display comprises a two dimensional liquid crystal display panel having a row and column array of display pixels acting as a spatial light modulator to produce the display. An array of elongate lenticular elements extending parallel to one another overlies the display pixel array, and the display pixels are observed through these lenticular elements.

The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

In an arrangement in which, for example, each lenticular element is associated with two columns of display pixels, the display pixels in each column provide a vertical slice of a respective two dimensional sub-image. The lenticular sheet directs these two slices and corresponding slices from the display pixel columns associated with the other lenticular elements, to the left and right eyes of a user positioned in front of the sheet, so that the user observes a single stereoscopic image. The sheet of lenticular elements thus provides a light output directing function.

In other arrangements, each lenticular element is associated with a group of four or more adjacent display pixels in the row direction. Corresponding columns of display pixels in each group are arranged appropriately to provide a vertical slice from a respective two dimensional sub-image. As a user's head is moved from left to right a series of successive, different, stereoscopic views are perceived creating, for example, a look-around impression.

One method of mounting the lenticular array to the display panel is by creating a vacuum therebetween. During the manufacture, a 2D 'off-the-shelf' display panel may be partly disassembled so as to prepare it for the addition of a lenticular array. FIG. 1 shows such a 2D display apparatus comprising, for example, a liquid crystal display (LCD) panel 10 and a backlight unit 12. It will be appreciated that the apparatus is shown in the normal orientation during manufacture and that when in use (viewing) the display is positioned at approximately 90° to that shown. Lateral (as shown) movement of the display panel 10 relative to the backlight is prevented by a raised support pin 14 which is part of the backlight unit 12 itself. A bezel 16 is fixed to the backlight unit by a screw 18 and serves to prevent vertical movement of the display panel 10 relative to the backlight 12. It will be appreciated that the bezel 16 typically surrounds the display panel and that FIG. 1 only shows part thereof.

When mounting the lenticular array, the bezel 16 is removed from the apparatus. The lenticular array may then be vacuum mounted to the display panel 10. As shown in FIG. 2, a modified bezel 16 is then fixed in place, again with a screw 18 for example. The bezel is modified so as to extend to clamp the edge of the lenticular plate 20.

However, several problems exist in relation to this type of mounting, particularly when the lenticular array 20 is fixed to the display panel 10 by a vacuum mount. Firstly, the lenticular plate 20 is typically much thicker and heavier than the display panel 10, particularly for large displays which may have applications in signage for example. When in use, the display panel 10 carries the entire weight of the lenticular plate 20 which puts considerable stress thereon. This increases the chance of damage to the display panel 10 or even the backlight 12.

Secondly, the tooling used to implement the mounting of the lenticular plate 20 and the panel 10 typically requires a step 22 as shown in FIG. 2, for example for a vacuum mounting method with a vacuum between the lenticular plate 20 and the display panel 10. This prevents the lenticular from extending to the edge of the display panel 10. Consequently, the flexibility of the native display panel 10 combined with the additional weight of the lenticular array may cause the panel to 'ride' over the support pin 14 when in use, thereby reducing the alignment accuracy or even causing complete failure of the apparatus.

SUMMARY OF THE INVENTION

The invention is defined by the Independent claims. The dependent claims define advantages embodiments.

The lateral securing member supports the majority of the weight of the lenticular plate when in use, thereby reducing the stress on the relatively delicate display panel and the probability of failure. Furthermore, the stack comprising the panel and lenticular plate is prevented from sliding during regular use and from vibration during transportation.

The display preferable further comprises a bezel located around the display serving to prevent relative movement between the lenticular array, panel and backlight unit in a direction perpendicular to the plane of the panel.

The backlight may comprise an integral raised portion located around the edge of the display panel to prevent relative movement between the display panel and the backlight in a direction parallel to the plane of the display panel.

BRIEF DESCRIPTION OF THE DRAWINGS

Further features and advantages of the present invention will become apparent from reading of the following description of a preferred embodiment, given by way of example only, and with reference to the accompanying drawings, in which:—

DETAILED DESCRIPTION OF EMBODIMENTS

Figure 1:
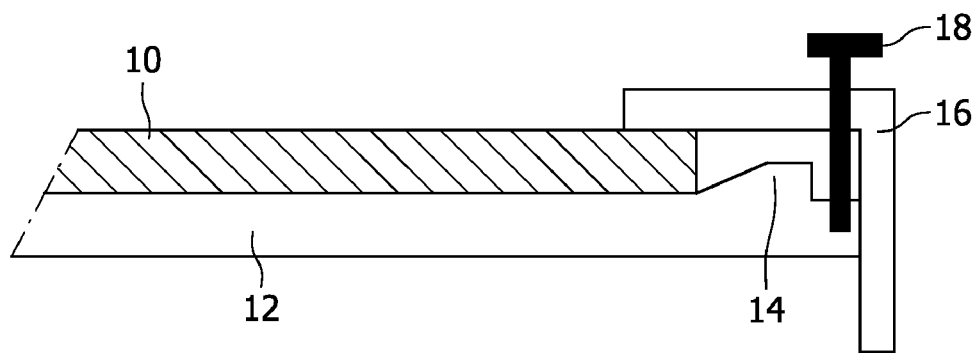
FIG. 1 is a schematic sectional view of part of a known 2D display panel.
Figure 2:
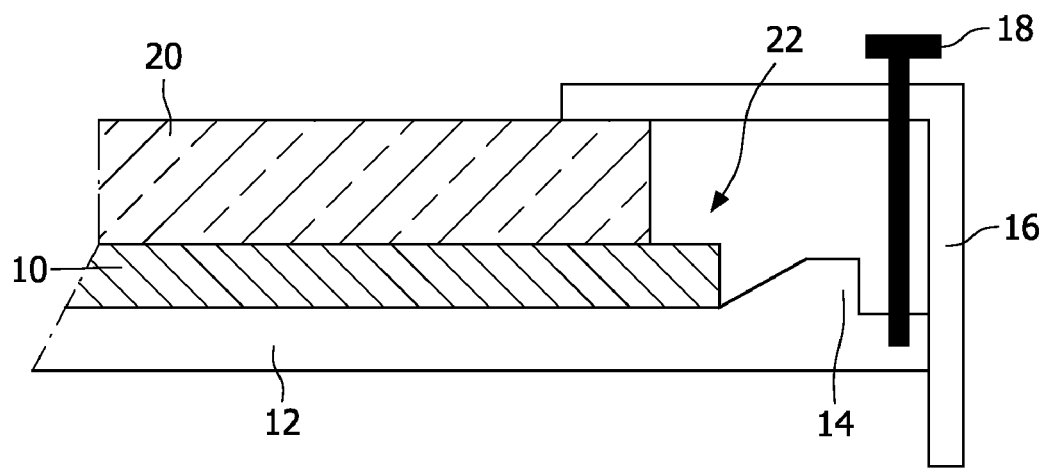
FIG. 2 is a schematic sectional view of an example autostereoscopic display.
Figure 3:
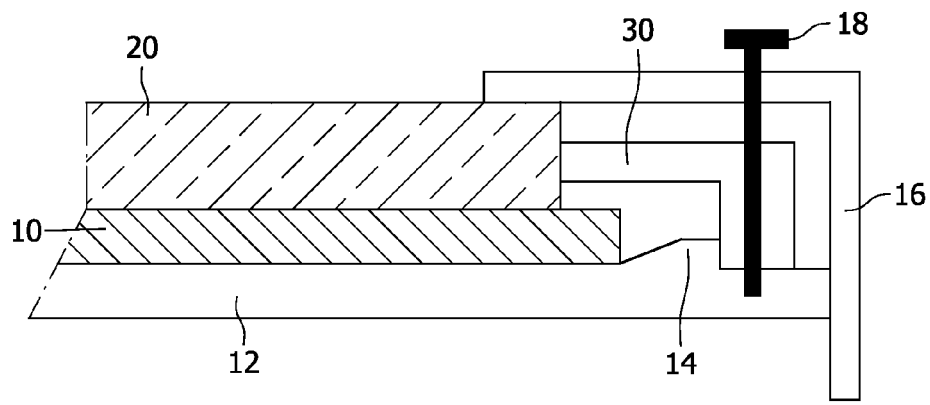
FIG. 3 is a schematic sectional view of an example autostereoscopic display according to the invention.

With reference to FIG. 3, a display panel 10 is mounted onto a backlight unit 12. The display panel 10 may, for example, be an LCD, electrophoretic or other pixel display. The backlight comprises an integral raised portion 14 located around the edge of the display panel to prevent relative movement between the display panel 10 and the backlight 12 in a direction parallel to the plane of the display panel. The form of these raised portions 14, or support pins, is typically defined by the manufacturing tools used to fabricate the backlight unit. Therefore, it is difficult to change the dimensions and/or form in which they are supplied.

A lenticular array 20 is mounted to the display panel 10. The mounting is done by providing a vacuum between the two surfaces with a typical pressure/vacuum of 1 kg/cm². The vacuum is maintained by a seal line around the edge of the mounting area. The lenticular array 20 is typically formed of glass, although persons skilled in the art will recognise that other materials can be used instead such as a transparent polymer for example. Glass in particular is relatively heavy, and in the case of a large signage display, for example, the lenticular array is a very heavy component of the autostereoscopic display.

Figure 4:
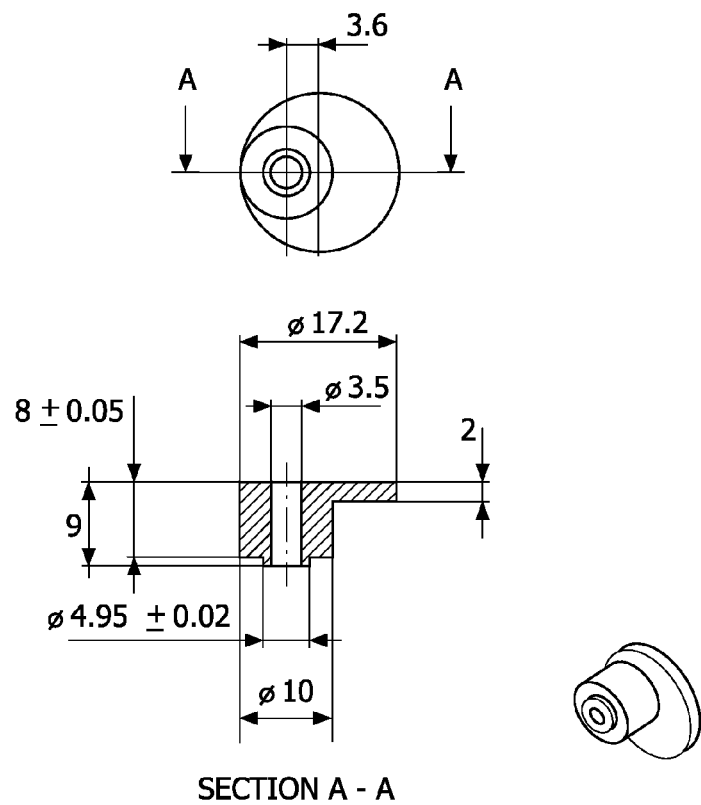
FIG. 4 illustrates example dimensions of the lateral support member according to the invention.

In accordance with the invention, a lateral securing member 30 is fixed to the backlight at the exposed edge beyond the display panel 10. In the embodiment shown, the lateral securing member is fixed outside the area of the support pin 14. FIG. 4 shows example dimensions of the securing member 30.

As shown in FIG. 4, the securing member comprises an upright section, through which a bore is provided for a fixing screw 18. At the top of the upright section is a flange section, which extends laterally, so that it can pass over the edge of the display panel to meet the outer edge of the lenticular sheet.

In the example shown, the flange section extends inwardly by 12.2 mm from the centreline of the bore. This may typically be in the range 5 mm to 20 mm.

The bore through the flange section is off-centre, so that it can be adjusted as a cam, to take account of manufacturing tolerances. The clamps are put in position when the seal line (that surrounds the vacuum area) has dried.

The particular design shown has the upright section and the flange section each in the form of a circular cylinder portion. Each section has an aligned bore, with the bore through the upright section centred in the circular cylinder, whereas the bore is off-centre for the flange section.

The height of the securing member is shown as 9 mm, and the height will be sufficient for the flange section to pass over the display panel and meet the lenticular sheet. This may typically be in the range 5 mm to 20 mm.

The securing member 30 serves to prevent relative movement between the lenticular array 20 and the backlight unit 12 in a direction parallel to the plane of the display panel 10. When in use, the majority of the weight of the lenticular plate 20 is supported by the securing member 30 thus reducing the risk of damage to the display panel 10.

It will be appreciated that the securing member can be of a different shape and/or dimension to that shown, provided that it serves the same function and thus fall within the scope of the invention.

With reference again to FIG. 3, a bezel 16 is positioned around the edge of the display and is fixed to the backlight unit by means of screws 18, which screw also hold the lateral securing member 30 in place.

No additional fasteners are needed to secure the assembly, and the fixing screws enable the components to be fixed vertically and laterally as a result of the securing members 30.

The invention applies in particular to display devices comprising a light modulating display panel which is illuminated by an integrated backlight. As described above, the backlight comprises edge supports which define a retaining area for the light modulating display panel.

The example above uses a lateral securing member 14 attached to the backlight 12 to prevent lateral motion between the display panel 10 and the backlight 12. However, the lateral securing member 30 may be designed such that it also functions as a lateral securing member 14 for preventing lateral motion of the display panel 10 with respect to the backlight 12. In that case the lateral securing member 14 does not need to be attached to the backlight 12 beforehand and only one lateral securing member 30 can be used to prevent lateral motion of the components 20, 10, 12 with respect to each other is.

The example above uses a bezel to mount and secure the display panel 10 and lenticular array 20 in the direction perpendicular to the plane of the display. However, a bezel is not the only way to mount the components, and other possibilities will be apparent to those skilled in the art, and within the scope of the invention as claimed. For example, the functions of the lateral securing member and the bezel may be combined into a single component which secures the components both in the parallel and perpendicular directions. Alternatively the components are mounted using adhesives such as glue present between for example the display panel 10 and the lenticular plate 20.

From reading the present disclosure, other modifications will be apparent to persons skilled in the art. Such modifications may involve other features, which are already known in the design, manufacture and use of autostereoscopic displays and component parts thereof and which may be used instead of, or in addition to features already described herein.

Summarizing, the autostereoscopic display according to the invention comprises a lenticular array 20 mounted to a display panel 10 which display panel is mounted to a backlight unit 12. A bezel (16) is located around the apparatus serving to prevent relative movement between the lenticular array 20, the display panel 10 and the backlight unit 12 in a direction perpendicular to the plane of the display panel 10. A lateral securing member is 30 disposed directly between the backlight unit 12 and the edge of the lenticular array 20 to prevent relative movement in a direction parallel to the plane of the display panel 10.

The stack comprising the display panel 10 and the lenticular array 20 is prevented from sliding during regular use and from vibration during transportation.

It should be noted that the above-mentioned embodiment illustrates rather than limits the invention, and at that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that the combination of these measures cannot be used to advantage.

The invention claimed is:

1. Autostereoscopic display comprising a lenticular array mounted to a display panel which display panel is mounted to a backlight unit, a bezel located around the autostereoscopic display, the bezel serving to prevent relative movement between the lenticular array, the display panel and the backlight unit in a direction perpendicular to the plane of the display panel, and a lateral securing member disposed directly between the backlight unit and the edge of the lenticular array to prevent relative movement between the backlight unit and the lenticular array in a direction parallel to the plane of the display panel, wherein the securing member is fixed to the backlight unit at an exposed edge of the surface of the backlight unit against which the display panel is mounted, the exposed edge extending beyond the display panel.

2. Autostereoscopic display according to claim 1, wherein the backlight unit comprises an integral raised portion located around the edge of the display panel to prevent relative movement between the display panel and the backlight unit in a direction parallel to the plane of the display panel.

3. Autostereoscopic display according to claim 1, wherein the lateral securing member is fixed to the backlight unit by screw means.

4. Autostereoscopic display according to claim 3, wherein the screw means also serves to secure the bezel to the backlight unit.

5. Autostereoscopic display according to claim 1, wherein the display panel extends beyond the edge of the lenticular array.

6. Autostereoscopic display according to claim 5, wherein the lateral securing member comprises an upright portion and a lateral portion, the lateral portion extending over the edge of the display panel.

7. Autostereoscopic display according to claim 6, wherein the lateral securing member comprises a first planar face which abuts against the backlight unit and a second planar face in a plane perpendicular to the first planar face and which abuts against an outer edge of the lenticular array.

8. Autostereoscopic display according to claim 6, wherein the distance by which the lateral portion extends inwardly from the upright portion is adjustable by rotating the securing member.

9. Autostereoscopic display according to claim 1, wherein the display panel comprises a light modulating display panel, which display panel is illuminated by the backlight unit.

10. Autostereoscopic display according to claim 9, wherein the display panel comprises an LCD panel.

* * * * *